Sept. 30, 1924.

R. G. DU BOIS 1,510,212

DEVICE FOR OPENING STOPPED DRAINPIPES

Filed Nov. 29, 1922　　2 Sheets-Sheet 1

Inventor:
Rhea G. Du Bois

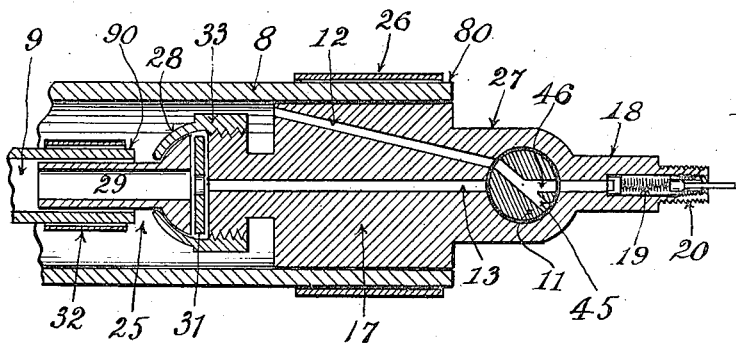
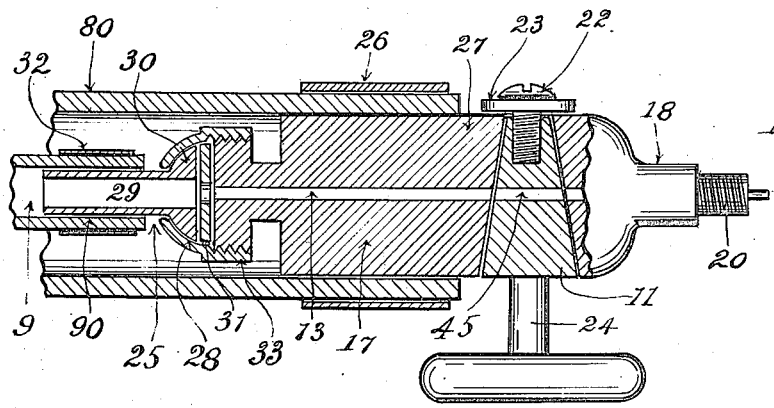

Patented Sept. 30, 1924.

1,510,212

UNITED STATES PATENT OFFICE.

RHESA G. DU BOIS, OF EAST ORANGE, NEW JERSEY.

DEVICE FOR OPENING STOPPED DRAINPIPES.

Application filed November 29, 1922. Serial No. 604,072.

*To all whom it may concern:*

Be it known that I, RHESA G. DU BOIS, a citizen of the United States, and resident of East Orange, in the county of Essex and State of New Jersey, have invented certain new and useful Improvements in Devices for Opening Stopped Drainpipes, of which the following is a specification.

This invention relates to an apparatus for clearing out stopped underground pipes, and more particularly those drains which connect dwelling houses with street sewers.

My purpose is to provide a simple, practical and efficient air-pressure emergency apparatus for use of plumbers and other domestic engineering specialists, which apparatus may be conveniently coiled upon a reel and thus made readily portable so that it can be quickly applied in emergencies.

To this end my invention consists in the peculiar features and combinations of parts more fully described hereinafter and pointed out in the claims wherein—

Figure 3:
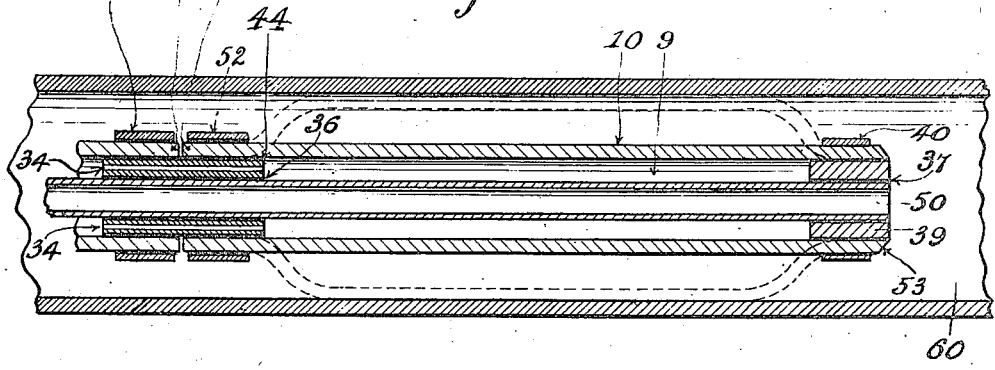

Figure 3 a sectional view of the stopper-head before inflation and while in the act of curving round a "forty-five" or clean-out pipe connection, and Figures 4 and 5 views, mostly in section, of a two-way valve for alternately switching the ingoing air from one pipe to the other.

The reference numeral 1 is an ordinary drain-pipe adapted to be buried under the ground 2, and provided with the usual "forty-five" or clean-out section 3, projecting above the cellar floor or ground 2. Numeral 6 is an obstruction or stoppage in said drain-pipe and located ahead of a section 7.

It frequently happens that the stoppage is a long distance from the clean-out pipe 3, and beyond the reach of such common expedients as push-out wires, plungers, etc., and under such circumstances the only alternative lies in digging up the lawn, the street or other pipe-covering at the point of difficulty.

For the purpose of avoiding all such troubles I drive the stoppage forward into the main sewer with air pressure in the peculiar manner and with the peculiar mechanism now to be described. The motive-power for injecting air may consist of any suitable means, but for purposes of illustration, a common portable hand-pump 5 is employed. This pump forces air through pipe 15 to a two-way valve 11 and thence alternately through two independent air-supply pipes 8 and 9 placed one within the other. The outer pipe 8 delivers air to expand a stopper-head 10 fastened on the fore end 41 of said pipe. The inner or blow-out pipe 9 passes through the stopper-head 10 and delivers air to expel the stoppage 6. This blow-out pipe is hermetically attached externally at the points 36 and 37 where it goes through the head 10. Both pipes are flexible and are preferably composed of rubber in order to follow the elbows and bends of the drain-pipe, as seen more clearly in Fig. 3, in the operation of pushing them through the pipe to the point of difficulty, and for the further purpose of coiling upon a reel.

It is also important that the stopper-head should be bendable and flexible as well as slender in order to go through the drain-pipe easier. For the more nearly the stopper-head 10 and the pipe 8 correspond in diameter the easier they will negotiate the obstructions met with. Following out that idea I give the head the shape of an elongated tube having the diameter of outer pipe 8 whereby it will round an elbow 35 as seen in Fig. 3. Furthermore the stopper-head should be constructed to withstand a predetermined air-pressure which will not burst the head but which will expand it sufficiently to seal the drain-pipe against the back-flow of air or water and at the same time maintain a strong grip on the inside of the pipe 1, which grip must be stronger than the adherence of the stoppage 6.

Therefore the stopper-head must be made of tough fibreless rubber, like the inner tube of a pneumatic tire, but thicker and stronger. The forward extremity 50 (Fig. 2) of the blow-out pipe 9 is hermetically attached to the forward end 53 of the stopper-head by a sleeve 39 and hose clamp 40.

The contiguous ends 41 and 42 of pipe 8 and head 10 respectively are connected by a tubular coupling 44 provided with longitudinal air ports 34 which permit the charge of inflating air to pass in and out of the head. Blow-out pipe 9 passes longitudinally through the center of coupling tube 44 to which it is hermetically secured Encircling hose-clamps 51 and 52 effect an air-tight joint between the parts where applied In this way the blow-out air is sent to act upon the stoppage without reducing the air-pressure inside the head. If the pressure were reduced in said head, slippage might follow and weaken the effectiveness of the charge.

To permit observation of air pressure within the head, and thus warn the operator of a bursting overcharge, I incorporate in the air line 15 an air-gauge 16. The latter may be of any common type now in general use, and is connected by nipples 21 and 49 and hose connections 4 and 14.

Referring to Figures 4 and 5, the distribution of the air is effected by a two-way valve 11 which commands the outer ends of the two pipes 8 and 9, and when the pump is in action, admits air first into one pipe and then into the other. This two-way valve may be of any common type, but for illustrative purposes, I employ one with a transverse passage 45 and a branch-passage 46. Whenever 46 is turned to coincide with diagonal passage 12 in valve seat 27 air will be directed into the larger hose 8 to inflate stopper-head 10, and whenever passage 45 is turned to coincide with central passage 13, air will be delivered to blow-out pipe 9, at the same time holding the air confined in the stopper-head. The valve-seat 27 has right and left extensions 17 and 18. The right-hand extension 18 is provided with a common air-check valve 19, and a threaded nipple 20 for the reception of hose-connection 14 on gauge-nipple 49, and valve 11 is provided with a manipulating handle 24 at one end and an adjusting screw 22 and washer 23 at the other end. The two outer ends 80 and 90 of pipes 8 and 9 are hermetically connected respectively to the left-hand portion 17 of the valve 11 by hose-clamps 26 and 32. Clamp 32 encircles a nipple 29 on an ordinary universal air-tight hose connection 25. Said connection comprises a screw-gland 33 having a spherically concaved socket 28, to receive a semi-spherical head 30, a gasket 31 intervening. As all the aforesaid fastening elements are old further description is regarded unnecessary.

Figure 1:
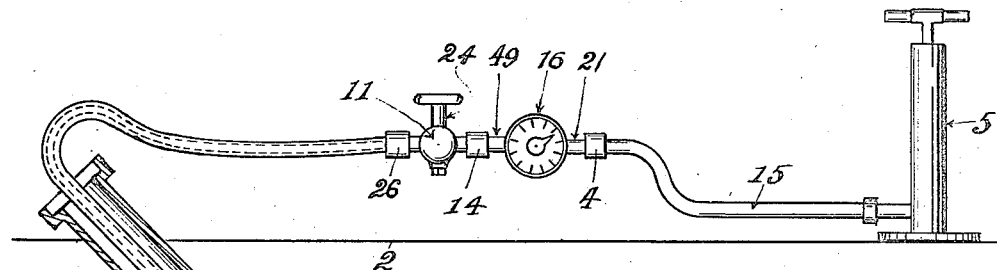
Figure 1 is a general view, partly in section, showing the preferred form of my device as when introduced into an ordinary house drain-pipe.

Briefly described the operation of my device is as follows:

The sewer-pipe 1 being obstructed by the stoppage 6 and filled with back-sewage, the deflated stopper-head 10 should be inserted into the mouth of the "forty-five," and then pushed forward endwise with the attached pipes 8 and 9 until the head 10 has passed all laterals and is in proximity to the stoppage as seen in Figure 1. In this act the buoyancy afforded by the liquid in the drain-pipe aids in partly floating the hollow pipes. Hence there will be little friction owing to the weight of the pipes dragging on the bottom of the drain-pipe. The two-way valve should now be turned so that the diagonal air-duct 12 will direct the ingoing air to the inflation pipe 8 as seen in Fig. 4.

Figure 2:
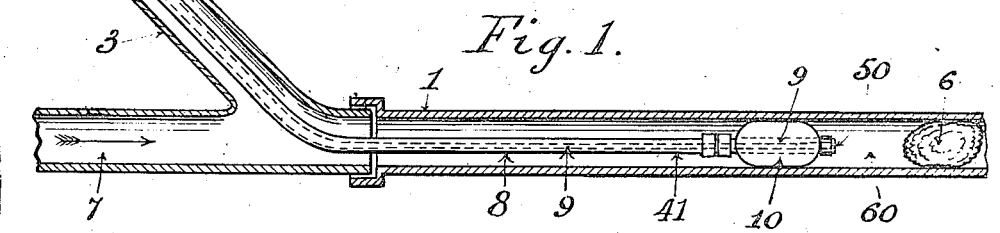
Figure 2 is a detail view of an expansible and contractible pneumatic stopper-head or bulb in which dotted lines show the head inflated to stop back-flow.

If the pump be now actuated, air will be delivered to the stopper-head, entering the latter through ports 34, 34 in sleeve 44 thereby expanding the head to the size shown in dotted lines in Figure 2, and thus forming a seal against back-flow of air.

When a predetermined air-pressure, as noted by the air gauge 16, has been reached, the two-way valve 11 should be turned to close diagonal duct 12 and open central duct 13 leading to the blow-out pipe 9 thus sealing the air in pipe 8 and head 10 and allowing the air under pressure to pass through the latter to the space 60 between the head and stoppage 6, whereupon the stoppage will almost invariably give way under the expansive force of the air.

The drain-pipe having thus been cleared, the stopper-head 10, which has been holding firmly during the blowing-out operation, should now be deflated for withdrawal. This may be done by turning the valve 11 (Fig. 4) so as to bring the port 46 to coincide with diagonal port 12, and then releasing the air in pipe 8 by opening air-check 19. The release of the air allows the stopper-head to shrink back to its original tubular contour, as shown in Figures 2 and 3, whereby the pipes and head can easily be withdrawn.

Having thus described the preferred form of my invention, what I claim is:

1. In a pneumatic pipe-clearing apparatus, a pair of flexible air-delivering pipes placed one within the other, in combination with an expansible stopper-head supplied with air by one of said pipes to expand and seal the pipe to be cleared, the other pipe being arranged and adapted to pass air beyond the stopper-head and to deliver it between the head and stoppage.

2. In a pneumatic apparatus for opening stopped drain-pipes, the combination with a stopper-head, of a flexible inflating pipe and a flexible blow-out pipe, and a two-way air-supply connection at the outer terminus of said pipes.

3. In an apparatus for clearing stopped drain-pipes, a pair of flexible pneumatic pipes located one within the other, in combination with an expansible and contractible stopper-head and a connection at the outer terminus of said pipes which connection is provided with an air-check and a two-way valve arranged and adapted to alternately deliver air first to one pipe and then to the other.

4. In a drain-pipe clearing device a plurality of flexible air-pipes extending side by side and attached to form a cable adapted to be inserted endwise in a stopped drain-pipe, said cable having the quality of bending around elbows, one of said ducts serving to convey a charge of inflating air to inflate a stopper and seal the drain-pipe, and the other duct serving to convey a separate current of air to and past the said stopper, and means for driving air under pressure through said blow-out duct until the expansive power of said blow-out charge overcomes the resistance of the stoppage, and means for holding the stopper against leakage during the blowing out action 5. In a pneumatic device for opening stopped drain-pipes, a stopper-head provided with a pair of flexible air delivery pipes, and means for forcing air through said pipes, in combination with a distributing valve and air-check-valve.

6. An apparatus for clearing stopped drain-pipes, which apparatus consists of a pair of separate and independent air-pipes for inflating and ejecting respectively, in combination with a distributing valve having an air-check and hose connection.

7. In an apparatus for clearing stopped drain-pipes, an inflatable stopper-portion in combination with a pair of concentric rubber pipes provided with suitable connections for receiving and conveying two independent currents of air, one to inflate the stopper and the other to blow out the stoppage.

8. In an apparatus for clearing stopped drain-pipes a pair of air conductors secured to each other so as to bend collectively in combination with an inflatable stopper-head attached to said air conductors by means of a pipe-connection having two air passages, one to admit air for inflating the stopper and the other to admit the blow-out air going past the stopper.

9. In an apparatus for clearing stopped drain-pipes, the combination with an inner and outer air-pipe and a stopper-head attached to said pipes, of a perforated sleeve encircling the inner pipe and encircled by the outer pipe whereby inflating air may be driven through the sleeve into the stopper-head independently of the inner pipe.

Signed at East Orange, in the county of Essex and State of New Jersey this 28th day of November, A. D. 1922.

RHESA G. DU BOIS.